(12) United States Patent
Butler et al.

(10) Patent No.: US 10,189,497 B2
(45) Date of Patent: Jan. 29, 2019

(54) STEERING COLUMN ASSEMBLY

(71) Applicant: TRW Limited, Solihull, West Midlands (GB)

(72) Inventors: Stephen Butler, Wolverhampton (GB); Niclas Davies, Birmingham (GB); Prasanna Chaturacharimath, Solihull (GB)

(73) Assignee: TRW Limited, Solihull, West Midlands (GB)

( * ) Notice: Subject to any disclaimer, the term of this patent is extended or adjusted under 35 U.S.C. 154(b) by 81 days.

(21) Appl. No.: 14/899,181

(22) PCT Filed: Jun. 17, 2014

(86) PCT No.: PCT/GB2014/051856
§ 371 (c)(1),
(2) Date: Dec. 17, 2015

(87) PCT Pub. No.: WO2014/202964
PCT Pub. Date: Dec. 24, 2014

(65) Prior Publication Data
US 2016/0144884 A1 May 26, 2016

(30) Foreign Application Priority Data
Jun. 17, 2013 (GB) .................................. 1310768.5

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ........ B62D 1/187; B62D 1/184; B29C 33/20; B29C 43/00; B22C 11/10
See application file for complete search history.

(56) References Cited

U.S. PATENT DOCUMENTS 6,139,057 A 10/2000 Olgren et al.
9,150,241 B2 * 10/2015 Nakazato ............... B62D 1/184
(Continued)

FOREIGN PATENT DOCUMENTS

EP 2105369 A2 9/2009
EP 2193976 A2 6/2010
(Continued)

OTHER PUBLICATIONS

Patents Act 1977: Search Report under Section 17(5), Application No. GB1310768.5, dated Dec. 13, 2013.
(Continued)

*Primary Examiner* — Karen Beck
(74) *Attorney, Agent, or Firm* — MacMillan, Sobanski & Todd, LLC

(57) ABSTRACT

An adjustable steering column assembly comprises a steering column shroud, a support bracket, and a clamp mechanism. The support bracket comprises two arms having a portion of the column shroud located therebetween. The clamp mechanism comprises a pin that passes through slots in the arms and carries a fixed cam portion and moving cam portion, relative rotation of the fixed cam portion and moving cam portion causing the clamp mechanism to move between a locked position and an unlocked position. The fixed cam portion has an anti-rotation feature that sits at least partially within one of the slots in one of the arms and which co-operates with the side walls of the slot to substantially prevent unwanted rotation of the fixed portion of the cam mechanism. The anti-rotation feature carries at least one contact portion that in use contacts the side walls of the slot as the steering column is adjusted and the contact portion and side walls are configured such that in use the anti-rotation feature does not cause any significant permanent
(Continued)

deformation of the side walls due to preferential deformation of the contact portion.

9 Claims, 5 Drawing Sheets

(56) References Cited

U.S. PATENT DOCUMENTS

2005/0280341 A1* 12/2005 Vardon ................ A47B 96/021
 312/408
2014/0284909 A1* 9/2014 Nakazato ............... B62D 1/187
 280/775

FOREIGN PATENT DOCUMENTS

| GB | 2279728 A | 1/1995 |
| GB | 2287773 A | 9/1995 |
| JP | 2002145078 A | 5/2002 |
| JP | 2008307959 A | 12/2008 |
| WO | 2014010641 A2 | 1/2014 |
| WO | 2014202964 A1 | 12/2014 |

OTHER PUBLICATIONS

International Search Report and Written Opinion, Application No. PCT/GB2014/051856, dated Aug. 13, 2014.

* cited by examiner

STEERING COLUMN ASSEMBLY

CROSS-REFERENCE TO RELATED APPLICATIONS

This application is a national stage of International Application No. PCT/GB2014/051856, filed Jun. 17, 2014, the disclosures of which are incorporated herein by reference in entirety, and which claimed priority to Great Britain Patent Application No. 1310768.5, filed Jun. 17, 2013, the disclosures of which are incorporated herein by reference in entirety.

BACKGROUND OF THE INVENTION

This invention relates to improvements in steering column assemblies, and to a support bracket for such assemblies.

Steering column assemblies for automotive vehicles and the like are increasingly required to be adjustable for rake and, in many cases, reach. This requires the column shroud, within which the steering column shaft attached to the steering wheel is rotatably located, to be fixed to the vehicle by a clamp mechanism which can be locked and unlocked to either prevent or permit adjustment of the column shroud position respectively.

One common arrangement uses a telescopic column shroud which comprises two tubes which slide one inside the other to permit reach adjustment. A fixing rail welded to one of the tubes is secured to a support bracket by the releasable clamp mechanism. Rake adjustment can be achieved by providing a support bracket which includes vertically extending slots through which the clamp mechanism passes. The clamp mechanism, which is secured to the fixing rail, can be moved vertically within these slots, taking the column with it to adjust rake.

A known arrangement for use in restricted spaces utilises a bracket in the form of an inverted U-shape having two arms depending from a base which have the vertical slots formed therein. The clamp mechanism includes a bolt which passes through the slots to link the arms together and the column is located between the arms. Tightening the bolt draws the arms together to squeeze them onto the column.

It is also known from WO2007/026224 to provide for a bracket in which one arm comprises inner and outer leaves. The outer leaf extends down from the bracket base as before, and the inner leaf is fixed to the free end of the outer leaf and extends back up towards the base. The clamp mechanism acts between the inner leaf and the other arm of the bracket. The function of the inner/outer leaves is to reduce variations in clamping force that arise during rake adjustment due to the clamp acting at different points along the clamp bracket arms. Both the inner and outer leaves can be made to flex such that changes in spring force of one leaf cancel out changes in the other as the clamp mechanism moves up and down.

In each case, the clamp mechanism typically comprises a cam that acts between a fixed part of a clamp pin and a part of one of the arms. The cam comprises a fixed cam part that is prevented from rotation by engagement of an anti-rotation feature in a slot in the arm and a rotating cam part that is typically secured to a locking lever. Rotating the lever causes the face of the moving cam to slide along the face of the fixed cam, varying the length of the cam in a direction along the axis of the clamp pin.

The anti-rotation feature is shaped so that it cannot rotate in the slot but is free to move along the slot. For instance, it may comprise a rectangular block that protrudes from the fixed cam part away from its cam face (or cam follower), the side walls of the block fitting snugly between the side walls of the slot. Any attempt to rotate the fixed cam part will be constrained by the slot.

BRIEF SUMMARY OF THE INVENTION

According to a first aspect there is provided an adjustable steering column assembly comprising a steering column shroud which supports a steering shaft for a steering wheel, a support bracket which is fixed in position relative to a part of vehicle, and a clamp mechanism, in which the support bracket comprises two arms of having a portion of the column shroud located therebetween, and in which the clamp mechanism comprises a pin or bolt that passes through slots in the arms and carries a fixed cam portion and moving cam portion, relative rotation of the fixed cam portion and moving cam portion causing the clamp mechanism to move between a locked position in which the clamp mechanism fixes the shroud in position relative to the support bracket arms and an unlocked position in which the clamp mechanism permits movement of the clamp pin along the slot thereby to enable movement of the shroud relative to the support bracket arms, in which the fixed cam portion has an anti-rotation feature that sits at least partially within one of the slots in one of the arms and which co-operates with the side walls of the slot to substantially prevent unwanted rotation of the fixed portion of the cam mechanism, characterised in that the anti-rotation feature carries at least one contact portion that in use contacts the side walls of the slot as the position steering column shroud is adjusted to help guide the anti-rotation feature along the slot, and in that the contact portion and side walls are configured such that in use the anti-rotation feature does not cause any significant permanent deformation of the side walls due to preferential deformation of the contact portion.

The applicant has appreciated that arranging for the anti-rotation feature to deform in preference to deformation of the side walls of the slot it is possible to prevent permanent deformation of the slot which may otherwise occur due to excessive clamp forces. By appropriate choice of materials and configuration it may be possible to prevent any permanent deformation of the side walls of the slot during normal use and the expected operational life of the assembly. Of course, there may still be a small amount of wear of the surface of the slot walls, but this can be reduced by choosing materials for the slot and contact portion that cause the contact portion to preferentially wear down before the slot.

The part of the contact portion that contacts the side wall may be more resilient than the side wall. For example, it may comprise a softer material than the side walls. For example, it may comprise a plastic or elastomeric material and the side walls may comprise a metal or metal alloy material. It may comprise a low friction material such as PTFE.

Making the contact portion softer allows it to deform slightly as it moves over the surface of the side walls during adjustment, making the movement feel smoother to a user. The deformation is achieved by compression of the material, and this compression absorbs energy in the even that a sudden rotational force is applied to the anti-rotation feature.

The part of the contact portion that contacts the side wall may comprise a low co-efficient of friction material (such as plastic or elastomer) relative to the co-efficient of friction of the side walls of the slot.

The part of the contact portion that contacts the side wall may be smoother than the side walls, which reduces friction during sliding.

The part of the contact portion that engages the side wall may be biased towards the side walls by a spring means, such as a spacer of resilient material, a compression spring or a torsion spring. The provision of a spring means allows the part to deflect as it tries to slide over any imperfections in the side wall which again makes adjustment feel smoother.

The spring means may be held captive in a pocket formed in the block. In one arrangement, the spring means and part of the contact portion that contacts the side wall may be integrally formed as two-shot moulding, and each may be made of a different material or of the same material with a different configuration. The part that contacts the walls is preferably of a harder wearing material than the spring.

When the spring means and contact portion may be formed as a rod of circular cross section, the spring comprising the half of the rod on one side of a plane that contains the axis of the rod and the other half of the rod forming the contact portion.

The anti-rotation feature may comprise a metal block that supports the contact portion, the block being sized and shaped relative to the width of the slot so that it rotation of the block is constrained by the side walls, the contact portion facing out from the block.

The block may be generally rectangular having a pair of outward facing opposed sides that sit within the slot facing the sides of the slot, the spacing between the slot walls being slightly greater than the spacing between the opposed sides of the anti-rotation means, the contact portion extending outward from at least one side of the block to contact the adjacent side wall.

Preferably a contact portion is provided on each side of the block so that it contacts both side walls.

Each contact portion may be provided adjacent a respective corner of the block, the two corners being diagonally opposed.

The two corners may comprise the corners of the block that are urged towards the side walls due to rotational forces applied to the block as the cam mechanism is moved towards the locked position.

Each of the contact portions may be discrete, in that they are separate from one another and not connected directly.

Contact portions may be provided adjacent all four corners of the block.

In one arrangement, the two contact portions located at the same end of the block may each comprise an end portion of an arm of a generally y-shaped resilient member, the end portion of the leg of the resilient member protruding from an end face of the block to form a bump stop which engages an end of the slot as the steering column shroud reaches an end of its adjustment travel.

Each y-shaped member may be located in a complimentary groove in the block.

Each arm of the member may be terminated by a shoe which contacts the slot wall in use. The shoe may be of a harder wearing material, such as a low friction plastic material, than the member, which may be of a resilient rubber or elastomeric material.

The leg of each y-shaped member may be terminated by a resilient pad that is located outside of the block and sits on the end face of the block.

There may therefore be two y-shaped members, one forming the two contact portions towards the corners at one end of the block and the other forming two contact portions towards the other corners of the block.

In an alternative arrangement, the contact portion may comprise a liner that extends along both sides of the block of the anti-rotation feature, and may completely cover both sides. In this arrangement there is no need to form pockets or grooves in the block as the liner can sit on the outside of the block.

The liner may extend all the way around the anti-rotation means to form an endless band. The liner may comprise a plastic or elastomeric material. The liner may be bonded to the block.

The thickness of the liner may be selected together with the resilience of the material such the liner can deform sufficiently to allow for roughness of the wall of the slot without the block that supports the liner being deflected. The liner should therefore may slightly "squashy", the thick resilient material acting as a spring when compressed to absorb and dissipate impact energy if a high rotational force is suddenly applied to the fixed cam.

The bracket may be arranged so that one arm of the U-shaped member comprises an outer leaf extending from the base to a free end of the arm and an inner leaf connected to the free end of the arm and extending upwards from the free end towards the base, the inner leaf being located between outer leaf and the other arm of the U-shaped member, the slot that accommodates the anti-rotation part being formed in the outer leaf.

The inner leaf is so constructed and arranged as to form a main body portion which is fixed to the outer leaf and a tab which is connected to the main body portion along an upper edge so that it can flex relative to the main body portion, the tab extending from its upper edge towards the other end of the inner leaf, the tab including at least a part of a slot which extends downwards from a point at or adjacent to the top of the tab to a point closer to the bottom of the tab, and in which the clamp mechanism acts to apply tension between the tab of the inner leaf and the other arm.

The base of the U shaped bracket is preferably located above a portion of the column assembly, as is the clamp mechanism. Thus, the base may be located horizontally above the portion of the steering column with the arms depending vertically downwards such that the U-shape is inverted.

The shroud may be telescopic and may comprise an inner member and an outer member, the inner member being at least partially received within the outer member.

The arms of the U-shaped member may clamp on to a portion of the outer or inner members, or to a fixing rail secured thereto. The engagement between the inner leaf and the fixing rail (or other part) is preferably over a smaller vertical distance than the engagement between the fixing rail (or other part) and the more rigid arm. By vertical distance we mean the distance vertically when the arms of the bracket are considered to be aligned vertically. This ensures that small deformations of the inner leaf out of the vertical as the clamp mechanism is locked are absorbed without any significant rotation of the column assembly.

Other advantages of this invention will become apparent to those skilled in the art from the following detailed description of the preferred embodiments, when read in light of the accompanying drawings.

DETAILED DESCRIPTION OF THE INVENTION

Figure 1:
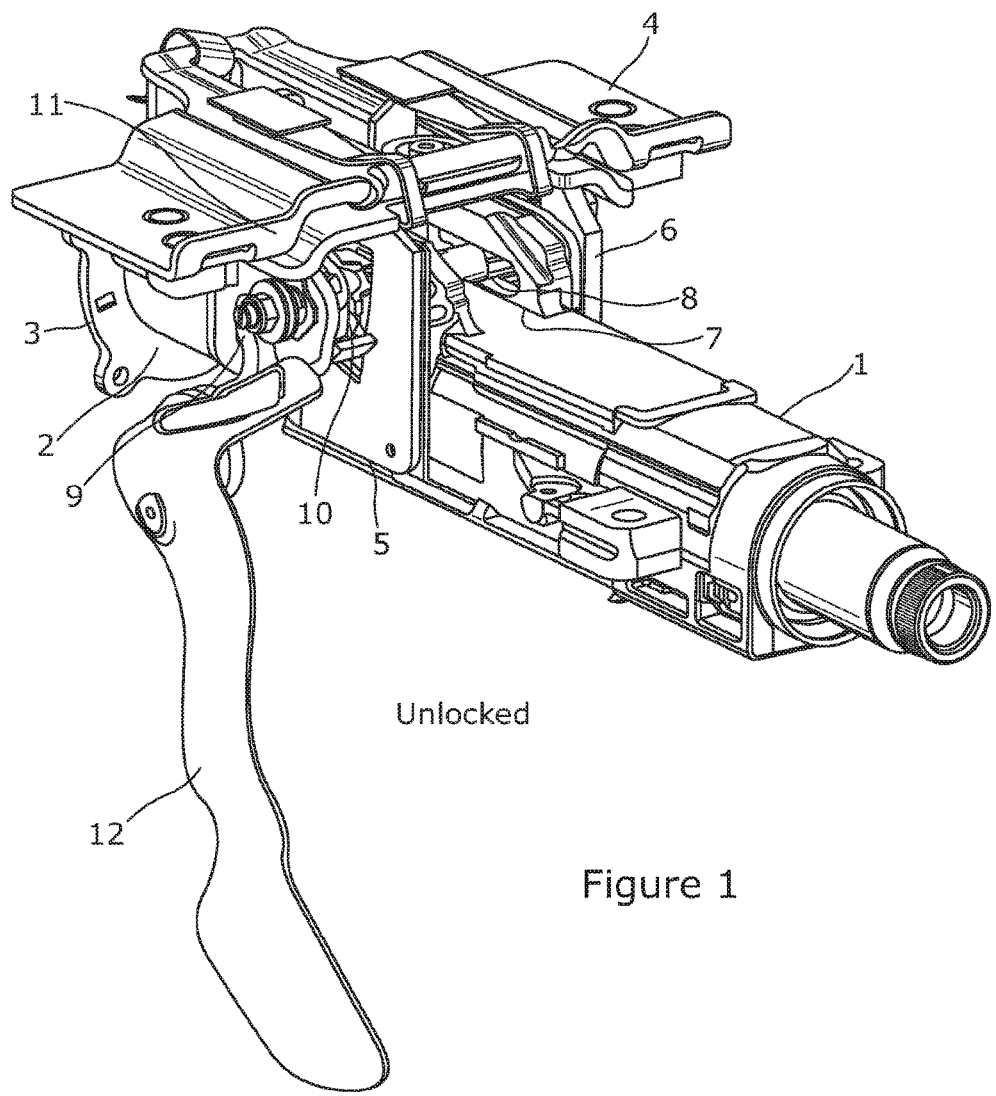
FIG. 1 is view from above and to one side of an embodiment of a steering column assembly for a vehicle according to the present invention when in the unlocked position.
Figure 2:
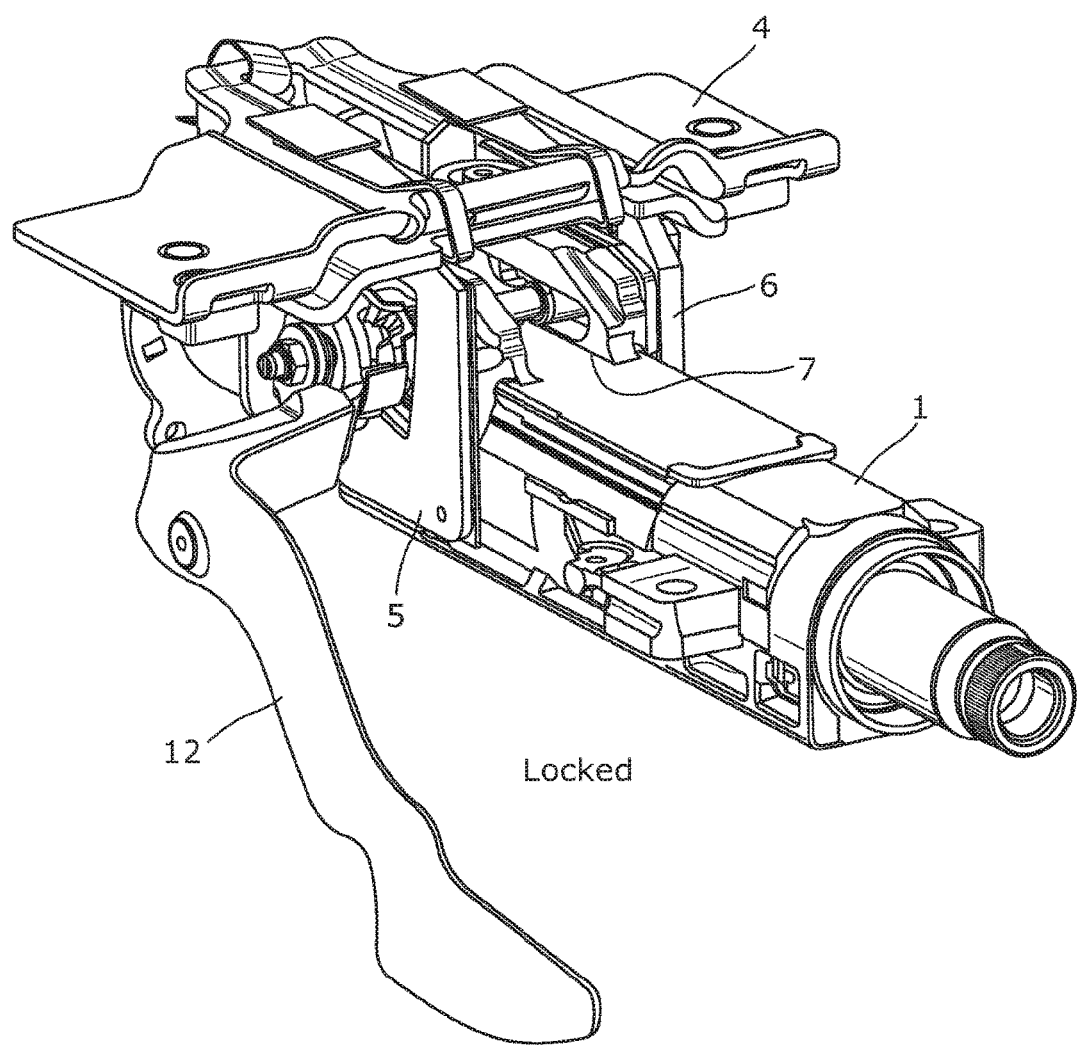
FIG. 2 is a view from above and to one side of an embodiment of a steering column assembly for a vehicle according to the present invention when in the locked position.

As shown in FIGS. 1(a) and 1(b), a steering column assembly comprises a steering column shroud 1, 2 that extends from a gearbox housing 3 that is fixed at a pivot point to a part of the vehicle body and also releasably fixed to a support bracket 4 which is secured to the vehicle, typically by welding or bolting it to a region under the dashboard at a point somewhere between the pivot and the steering wheel. The shroud 1, 2 is fixed to the bracket 4 by a clamp mechanism. The clamp mechanism can be unlocked and locked to allow the rake of the steering column shroud to be adjusted by pivoting about the pivot point. When locked the steering column shroud cannot easily be moved.

The bracket 4 is in the form of a metal sheet pressed into an inverted U-shape, with the base of the U lying in a generally horizontal plane above the steering column shroud. The two dependent arms 5, 6 of the U-shaped bracket extend generally downwards in a vertical plane and extend down either side of a fixing rail 7 welded to a moving portion 1 of the steering column shroud. A clamp mechanism acts between the two arms 5, 6 to squeeze them together so that they clamp onto the sides of the fixing rail 7 when the clamp mechanism is in its locked position, thereby holding the shroud in position.

Figure 3A:
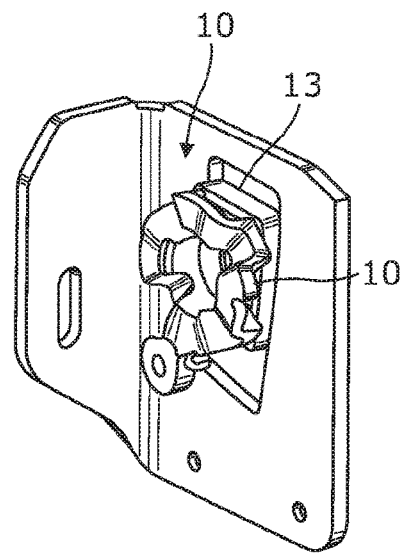
FIG. 3(a) is a view from the same position as FIG. 1 showing only the cam mechanism of the steering assembly and it relative position to a slot in the arm of the support bracket.
Figure 3B:
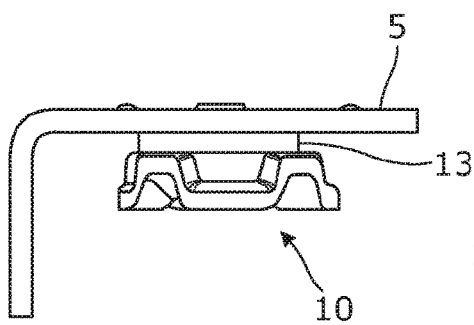
FIG. 3(b) is a plan view of the cam mechanism and bracket arm of FIG. 3(a) clearly showing an anti-rotation feature of the cam mechanism entering the slot.

The clamp mechanism comprises a shaft such as a bolt or pin 8 which passes through a respective generally vertical slot 5a in each arm and generally horizontal slots (not shown) in each side of the fixing rail 7. The size and shape and location of these slots determines the range of movement that is possible for the steering column shroud. A head (not shown) is provided on one end of the shaft, which has an outer dimension greater than the width of the slot in the adjacent arm 6 so that it cannot pass through the opening. Threaded onto the other end of the shaft 8 is an adjustable nut 9, and between that nut 9 and the outside of the outer leaf of the adjacent arm 5 is a cam assembly. The cam assembly comprises a fixed cam 10 carried by the shaft 8 and a moving cam 11 which can be rotated relative to the fixed cam by a locking lever 12. Rotation of the moving cam 11 varies the length of the cam assembly 10, 11. The fixed cam can be seen best in FIGS. 3 to 5, where two different arrangements of fixed cam are shown.

In the unlocked position, the cam assembly has its shortest length so that the bracket arms 5, 6 are not clamped to the fixed rail 7. In the locked position, the cam assembly has its longest length. The cam therefore pushes the arms of the bracket together onto the fixed rail 7. As this occurs, the force applied by the cam mechanism is opposed by the amount of "spring" in the arms 5, 6 of the bracket which resist being bent onto the fixed rail.

The two part shroud 1, 2 and shaft allow the steering wheel to be adjusted for reach. As the moving part of the shroud 1 is telescoped into (or onto) the fixed shroud part 2 the pin moves along the horizontal slot. In addition, the whole shroud can be adjusted for rake with the pin moving along the vertical slots. This movement is only possible when the clamp mechanism is unclamped, and ideally this should be a free and relatively unimpeded movement.

To prevent the fixed cam part rotating as the moving cam part is rotated, the fixed cam part includes an anti-rotation feature 13 that sits snugly between the side walls of the vertical slot permitting rake adjustment. The feature comprises a sintered metal generally rectangular block 14 that extends away from the cam face (or follower) of the fixed cam, i.e. away from the clamp lever. The block is provided with a hole 14a that passes through its centre which the shaft 8 passes through. The block 14 is a metal part that is integral to the fixed cam so that any attempt to rotate the fixed cam will result in the anti-rotation feature attempting to rotate. This rotation will typically be around the axis of the shaft 8.

The anti-rotation block is generally rectangular with two opposed side faces 16a, 16b connected by two end faces 17a, 17b. The spacing between the side walls of the slot is slightly greater than the spacing between the side faces of the block so that the block is free to move along the slot but cannot rotate, or at least cannot rotate by any significant amount.

Figure 4A:
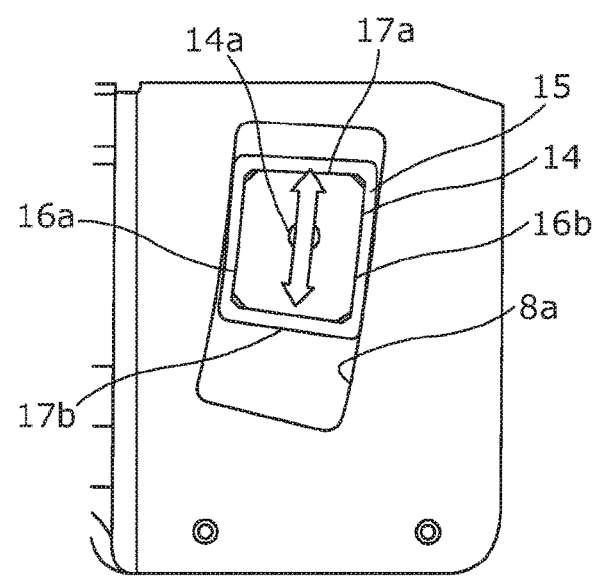
FIGS. 4(a) and 4(b) are views of the anti-rotation feature and slot only showing the location of a contact part of the feature in the form of a liner that contacts the side walls of the slot, the forces applied to the feature during adjustment being shown by the arrow in FIG. 4(a) and the forces applied when locked being shown by the arrow in FIG. 4(b)
Figure 4B:
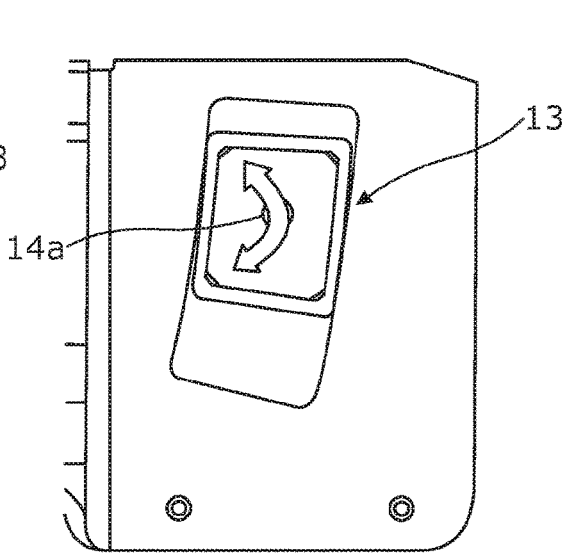

In a first embodiment shown in FIGS. 4(a) and 4(b), the side faces and end faces of the block are covered with a plastic liner in the form of a continuous band 15. The band 15 comprises a plastic or elastomeric material with a low co-efficient of friction. This band forms a contact portion that is supported by the block and moves with the block. The contact portion provides the points of contact between the anti-rotation feature 13 and the side walls of the slot 5a. It is of a relatively soft material compared with the material for the bracket and as such is very slightly "squashy". The bracket in this example has metal or metal alloy arms and is therefore harder than the liner so that the liner will deform when placed under a load rather than the side walls of the slot.

With the liner 15 in place, any attempt to rotate the block 14 will tend to cause the corners of the liner to try to dig into the side walls of the slot. Because the liner material is softer than the walls of the slot it will not dig into the walls of the slot and will itself deform. The applicant has found that this is important because without the soft liner the corners of the hard sintered block can dig in and form permanent indentations in the side walls of the slot. These indentations may then be felt during adjustment as the block is moved along the slot. By making the liner softer than the side walls of the slot, any permanent deformation that occurs will be of the contact means rather than the slot. Because the contact means moves with the cam then the poor feeling of moving across indentations is prevented.

Figure 5:
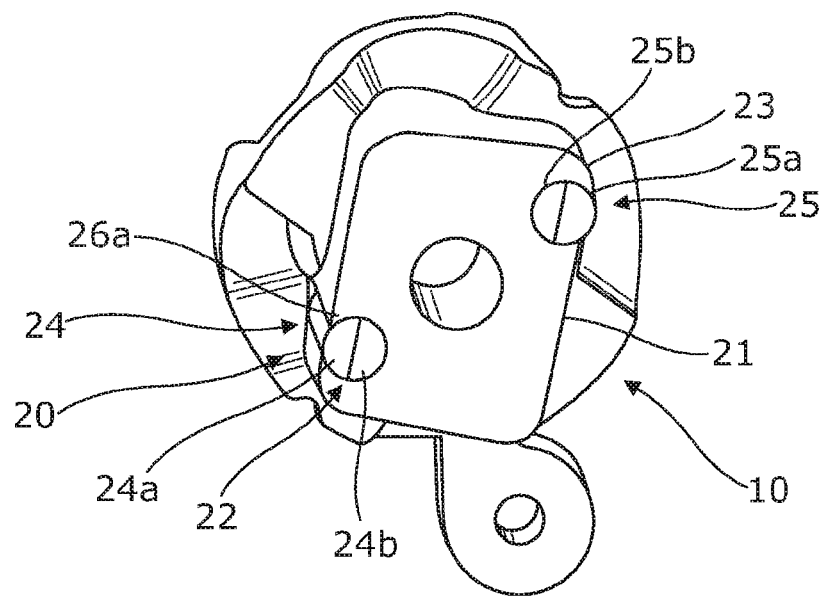
FIG. 5 shows an alternative cam anti-rotation feature that includes two discrete contact parts instead of a liner.
Figure 6:
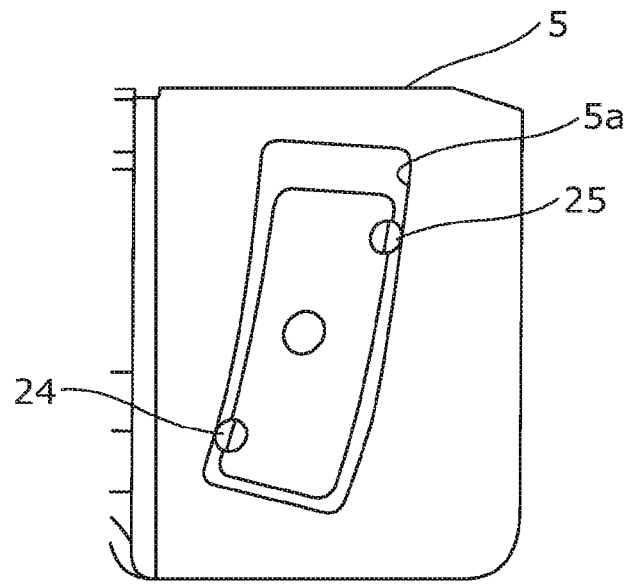
FIG. 6 shows the contact between the anti-rotation feature and the slot when in use.

In a second embodiment shown in FIGS. 5 and 6, an alternative anti-rotation feature 20 is provided on a fixed cam 10. This anti-rotation feature again comprises a rectangular block 21 of sintered metal having outwardly facing side faces and ends faces that sit within the parallel walls of the slot 5a in the arm 5. Located at or close to two diagonally opposed corners 22, 23 of the block are respective contact portions 24, 25. Each contact portion comprises a part 24a, 25a that contacts the side wall of the slot that is held captive in a recess. The part 24a, 25a protrudes outward beyond the face of the block 21 and is biased outwards by a respective spring 24b, 25b in the form of a resilient rubber spacer. To stop the contact part 24a, 25a escaping from the recess it is held captive by an overhanging portion 26a, 27a of the block 14.

The contact part 24a, 25a and resilient spring 24b, 25b of each contact portion are formed in one part using a two shot moulding process. Of course, in other arrangements they could be separate components.

The two contact portions 24, 25 are located at the corners of the block which would otherwise dig into the side walls of the slot as the clamp mechanism is moved to the locked position and held in the locked position.

Figure 7:
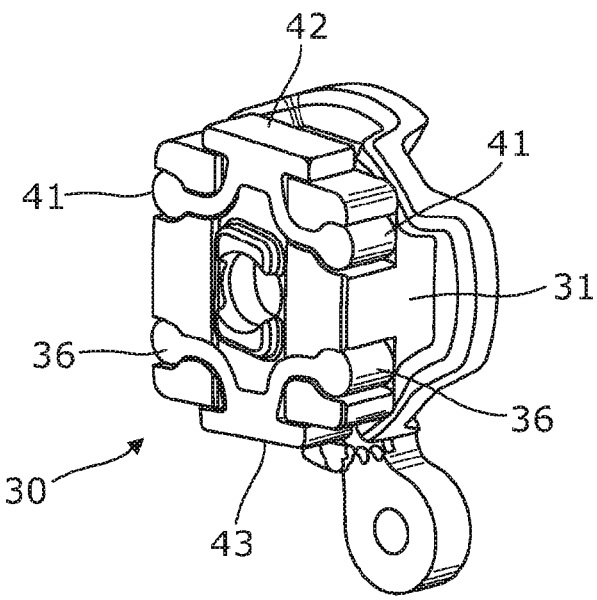
FIG. 7 shows an alternative anti-rotation feature that includes four contact portions and integral bump stops for and end of travel.
Figure 8:
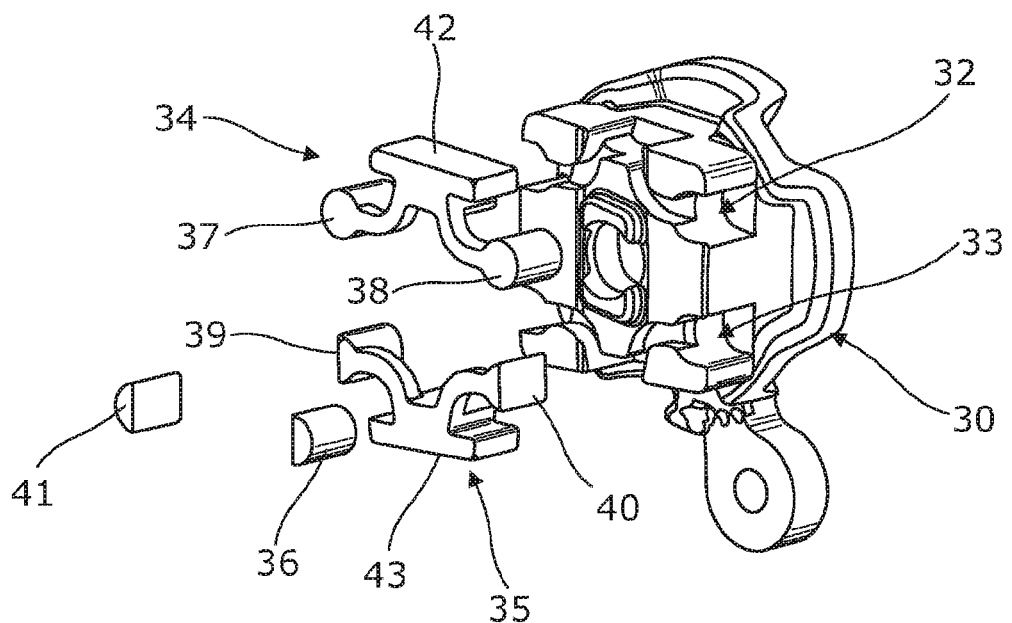
FIG. 8 is an exploded view corresponding to FIG. 7.

A further embodiment of an anti-rotation feature is shown in FIGS. 7 and 8 of the accompanying drawings. The anti-rotation feature comprise a sintered metal block 31 that projects from the fixed cam 30 of the clamp mechanism. As before, a hole extends through the block which allows the clamp pin to pass through. Two shaped grooves 32, 33 are formed in the block, one towards each end of the block. Each groove is generally y-shaped, the two arms of the y-shape terminating in pockets that are located in the opposing sides of the block close to the corners. The end of the leg of each y-shaped groove is located in the centre of the end of the block.

As shown in FIG. 7, each groove 32, 33 accommodates a resilient member 34, 35 which has a shape that is generally complimentary to the groove so that it is securely retained in the groove. The ends 37, 38, 39, 40 of the arms of the member are located in the pockets at the ends of the grooves.

As shown in the exploded view of FIG. 8, the ends of the arms are terminated with an optional shoe 36, 41 that contacts the side walls of the slot when in use. The resilient member 34, 35 that supports the shoes therefore functions as a spring whilst the shoe provides a smooth hard wearing contact surface.

The end of the leg of each y-shaped member is terminated with a pad 42, 43 that projects outwards from the sides of the end of the leg to form a t-shape. The pad 42, 43 is integrally formed with the y-shaped member and is resilient. The pad 43, 43 sits outside of the block and rests against the end face of the block. The pad 42, 43 acts as a resilient bump stop for when the block reaches the end of the slot in the arm.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An adjustable steering column assembly comprising:
   a steering column shroud which supports a steering shaft for a steering wheel, a support bracket which is fixed in position relative to a part of a vehicle, and a clamp mechanism, in which the support bracket comprises two arms having a portion of the column shroud located therebetween, and in which the clamp mechanism comprises a pin or bolt that passes through slots in the arms and carries a fixed cam portion and moving cam portion, relative rotation of the fixed cam portion and moving cam portion causing the clamp mechanism to move between a locked position in which the clamp mechanism fixes the shroud in position relative to the support bracket arms and an unlocked position in which the clamp mechanism permits movement of the pin or bolt along the slot thereby to enable movement of the shroud relative to the support bracket arms, in which the fixed cam portion has an anti-rotation feature that sits at least partially within one of the slots in one of the arms and which co-operates with side walls of the slot to substantially prevent unwanted rotation of the fixed portion of the clamp mechanism,
   wherein the anti-rotation feature carries at least one contact portion that in use contacts the side walls of the slot as the steering column shroud is adjusted to help guide the anti-rotation feature along the slot, and in that the contact portion and side walls are configured such that in use the anti-rotation feature does not cause any significant permanent deformation of the side walls due to preferential deformation of the contact portion, in which the part of the contact portion that engages the side walls is biased towards the side walls by a spring means, the spring means permitting at least part of the preferential deformation of the contact portion, in which the spring means and part of the contact portion that contacts the side walls are integrally formed as two-shot moulding, and in which the anti-rotation feature comprises a block that fits within the slot in the arm and the spring means comprises a resilient spacer that is held captive in a pocket formed in the block.

2. The adjustable steering column assembly according to claim 1 in which the block is generally rectangular having a pair of outward facing opposed sides that sit within the slot facing the sides of the slot, the spacing between slot walls being slightly greater than the spacing between the opposed sides of the anti-rotation means, the contact portion extending outward from at least one side of the block to contact an adjacent side wall.

3. The adjustable steering column assembly according to claim 2 which includes two contact portions, with one provided on each side of the block so that the contact portions contact both side walls.

4. The adjustable steering column assembly according to claim 3 in which the contact portions are provided adjacent a respective corner of the block, the two corners being diagonally opposed and in which the two corners comprises the corners of the block that are urged towards the side walls of the slot due to rotational forces applied to the block as the clamp mechanism is moved towards the locked position.

5. The adjustable steering column assembly according to claim 4 in which the two contact portions are located adjacent corners at the same end of the block, and in which each contact portion comprises an end portion of an arm of a generally y-shaped resilient member, the end portion of the leg of the resilient member protruding from an end face of the block to form a bump stop which engages an end of the slot as the steering column shroud reaches an end of an adjustment travel thereof.

6. The adjustable steering column assembly according to claim 5 in which the y-shaped member is located in a complimentary groove in the block.

7. The adjustable steering column assembly according to claim 5 in which each arm of the member is terminated by a shoe which contacts the slot wall in use.

8. The adjustable steering column assembly according to claim 5 in which the leg of the y-shaped member is terminated by a resilient pad that is located outside of the block and sits on the end face of the block.

9. The adjustable steering column assembly according to claim 5 in which two y-shaped members are provided, one forming two contact portions towards one end of the block and the other forming two contact portions towards the other end of the block.

* * * * *